United States Patent [19]

Guevremont

[11] Patent Number: 4,792,882
[45] Date of Patent: Dec. 20, 1988

[54] BIKE BRAKE LIGHT

[76] Inventor: Pierre Guevremont, 78 Rusholme Road, Toronto, Ontario M6J 3H6, Canada

[21] Appl. No.: 53,752

[22] Filed: May 26, 1987

[51] Int. Cl.$^4$ .............................................. B62J 6/00
[52] U.S. Cl. ...................................... 362/72; 340/134
[58] Field of Search ........................... 362/72; 340/134

[56] References Cited

U.S. PATENT DOCUMENTS

| | | | |
|---|---|---|---|
| 2,090,805 | 8/1937 | Oliver | 362/72 |
| 2,283,442 | 5/1942 | James | 362/72 |
| 2,433,469 | 12/1947 | Malmquist | 362/72 |
| 3,188,418 | 6/1965 | Pino | 340/134 |
| 3,878,387 | 4/1975 | Kojacic | 362/72 |
| 3,887,900 | 6/1975 | Goedert | 362/72 |
| 3,904,920 | 9/1975 | Griffith | 362/72 |
| 3,906,443 | 9/1975 | Musselman | 340/134 |
| 4,031,343 | 6/1977 | Sopho | 340/134 |
| 4,204,191 | 5/1980 | Daniels | 340/134 |
| 4,586,021 | 4/1986 | Nichols | 340/134 |

FOREIGN PATENT DOCUMENTS

| | | | |
|---|---|---|---|
| 3129062 | 2/1983 | Fed. Rep. of Germany | 340/134 |
| 3129198 | 8/1983 | Fed. Rep. of Germany | 340/134 |
| 1068313 | 2/1954 | France | 362/72 |

Primary Examiner—Larry Jones

[57] ABSTRACT

The present invention provides a brake light circuit for use with a cable controlled bicycle brake. The circuit includes a brake light, an electrical power supply for operating the brake light and a circuit opening and closing arrangement at least part of which is designed for mounting to and movable with the cable for opening and closing the circuit to activate the power supply when applying the brake.

6 Claims, 3 Drawing Sheets

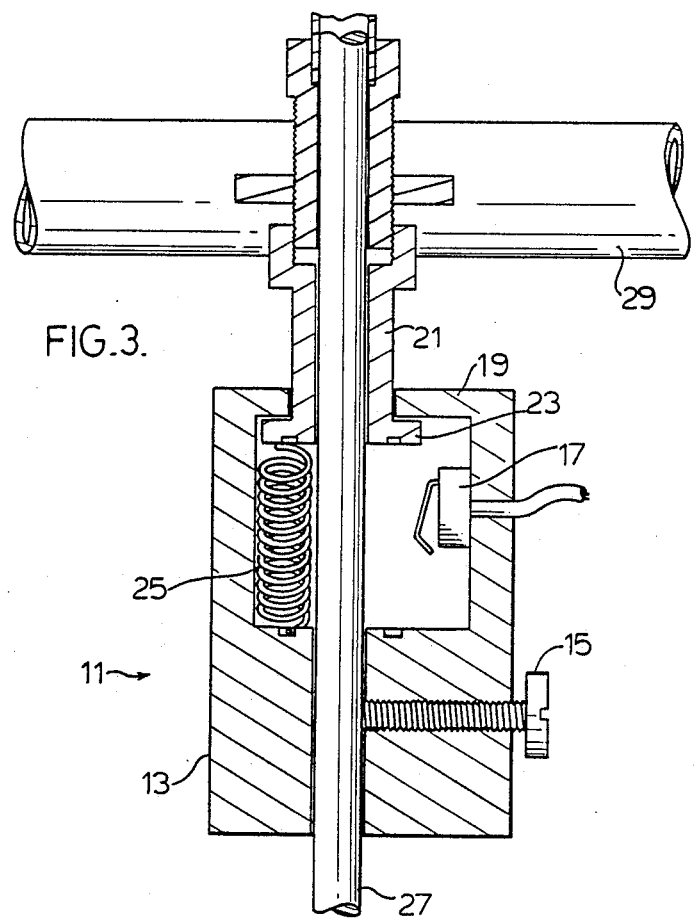
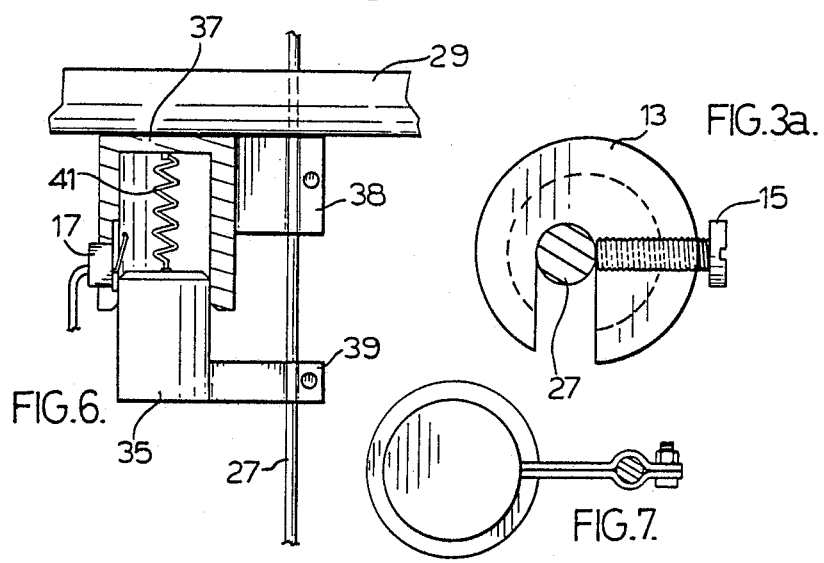

BIKE BRAKE LIGHT

FIELD OF THE INVENTION

The present invention provides a brake light for use with a cable controlled bicycle brake such as the hand operated caliper brakes found on most presently available bicycles.

BACKGROUND OF THE INVENTION

To date, there has been very little in the way of brake light development for use on a bicycle. The brake lights that are available such as that described in U.S. Pat. No. 4,204,191, May 20, 1980 to Travis J. Daniels are very complex and not readily installed by the user of the bike.

U.S. Pat. No. 3,878,387 issued Apr. 15, 1975 to Zarko Kovacic describes a somewhat less complicated bicycle brake lighting system. However, the problem with the Kovacic system is that it operates from the brake pad and if the circuit closing contact is not accurately placed in relation to the brake pad the system will not work.

SUMMARY OF THE PRESENT INVENTION

The present invention provides a brake light circuit for use with a cable controlled bicycle brake with the circuit comprising a brake light, a power supply for the brake light and a circuit opening and closing arrangement at least part of which is mountable to and movable with the cable for opening and closing the circuit to operate the power supply and the brake light when applying the brake.

The key feature to the present invention lies in its simplicity where the user of the bike can quickly and easily install the circuit which after initial set-up using the cable is not subject to wear and improper contact closure.

BRIEF DISCUSSION OF THE DRAWINGS

The above as well as other advantages and features of the present invention will be described in greater detail according to the preferred embodiments of the present invention in which;

FIG. 3 is an enlarged side view shown in partial section of the circuit closing arrangement from the circuit of FIGS. 1 and 2.

FIG. 3a is a sectional view taken along the lines 3a—3a of FIG. 3.

FIG. 6, on the same page of drawings as FIG. 3, is a side sectional view of a further preferred embodiment of the present invention.

FIG. 7 is a top view of the embodiment shown in FIG. 6.

DETAILED DESCRIPTION ACCORDING TO THE PREFERRED EMBODIMENTS OF THE PRESENT INVENTION

Figure 1:
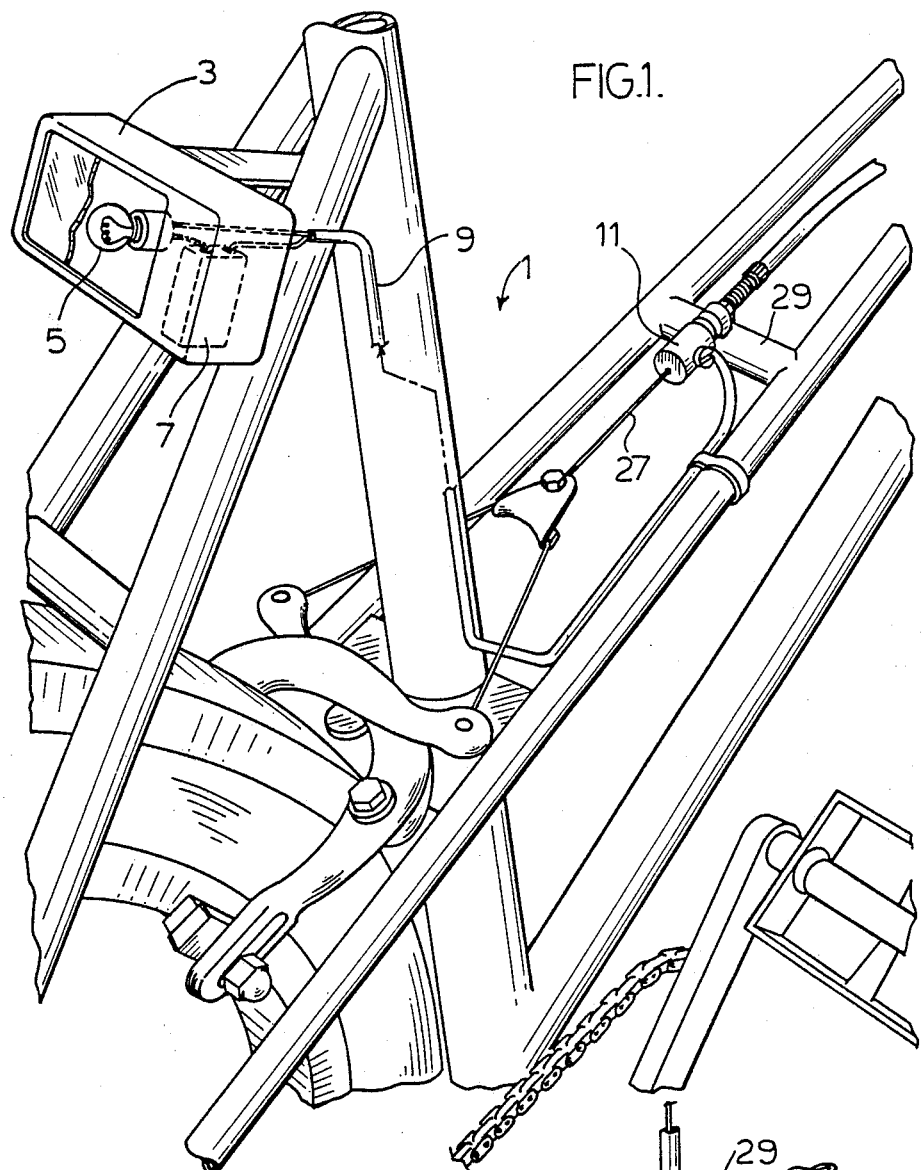
FIG. 1 is a perspective view of a brake light circuit according to a preferred embodiment of the present invention.
Figure 2:
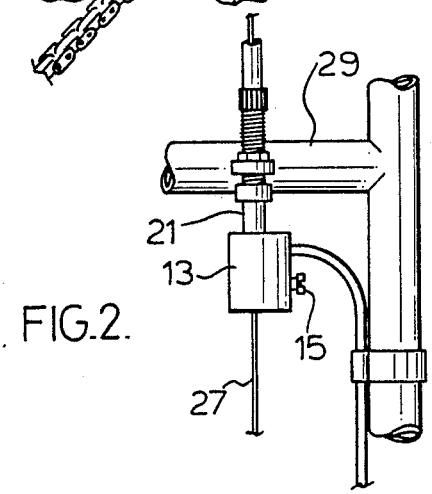
FIG. 2 is a plan view of the circuit closing arrangement from the circuit of FIG. 1.

FIG. 1 shows a brake light circuit generally indicated at 1 fitted to a bicycle. This brake light circuit comprises a frame mounted housing 3 with an electrically operated light bulb 5 and a portable power cell or battery 7 wired to bulb 5.

The electrical wiring from battery 7 passes through a common sheath 9 which is secured to the frame of the bicycle as shown and extends to a circuit closing arrangement 11. The key to the present invention is the set-up this arrangement for opening and closing the overall circuit to operate bulb 5.

FIG. 3 shows, in detail, arrangement 11. In particular, this arrangement comprises a pair of cable mount members 13 and 21 the former one of which supports a microswitch 17 wired back to battery 7. Note as shown in FIG. 3 when the bicycle brake is not applied the circuit is open at microswitch 17.

Both of the cable mount members 13 and 21 are mounted together with one another directly to cable 27 which is used to operate the caliper brake assembly as shown in FIG. 1 of the drawings. This cable and caliper arrangement is standard to most bike designs. Also standard is the fitting of the cable through frame portion 29 of the bike and acting as a cable sheath support and cable guide. Note that cable mount member 21 is in direct contact with frame portion 29 of the bike as best seen in FIG. 3.

In order to mount members 13 and 21 to the cable, both members are slotted along their lengths allowing them to be slipped over the cable and to then be tightened in position by means of set screw 15. This set screw passes through and secures member 13 in a fixed position relative to cable 27. The second member 21 is on the other hand trapped within a slide chamber defined by arms 19 of the first member 13 and allowed to slide relative to the first member. Located between the two members 13 and 21 is a spring 25 normally biasing flange portion 23 of member 21 away from microswitch 17.

The operation of the brake circuit is as follows; as the hand grip (not shown) for the brake is pulled inwardly to apply the brake, cable 27 is pulled upwardly in the direction as shown in FIG. 1 and causes the caliper brake to clamp on the bicycle wheel. This upward pulling of the cable results in a relative movement between member 13 which is affixed to the cable and member 21 through which the cable is slidable and which is not allowed to travel up with the cable because of its upper end contact with frame portion 29. This relative movement between the cable mounted members results in flange portion 23 of member 21 closing the microswitch to operate the brake light.

After the hand grip has been released, the caliper brake which is itself spring loaded in accordance with conventional practice pulls downwardly on the brake cable while spring 25 cause flange 23 of member 21 to move away from the microswitch which then returns to the FIG. 3 position opening the circuit and turning the brake light off.

In another embodiment of the invention, cable mounting member 21 is attached directly to frame portion 29 of the bicycle using the spring action of the caliper brake rather than using the separate spring 25 to pull on the cable and to cause the two contact points to separate and open the circuit as soon as the brake is released.

In still a further embodiment of the invention, the upper cable mounting member is elimated completely and the microswitch is mounted atop the member fixedly secured to the cable for closing against the frame portion of the bike.

FIGS. 6 and 7 show an arrangement very similar to that of FIGS. 1 through 3a with the exception that the circuit opening and closing arrangement is mounted off-set to one side of cable 27. More particularly, this arrangement includes an upper member 37 housing microswitch 17 and a lower member 35. These two members are mounted to the cable by means of clamps 38 and 39 respectively. Normally, biasing the two members apart from one another is an internal spring 41.

The operation of the arrangement shown in FIG. 6 is identical to that described above, i.e. the cable is slideable through clamp 38 on the upper member 37 while clamp 39 on lower member 35 is fixedly secured to the cable. As the hand brake is pulled, cable 27 as well as lower member 35 move upwardly to close microswitch 17 within the upper member 37 abutting frame portion 29 of the bike. As the hand brake is released the spring action of the caliper causes cable 27 and the lower member 35 to move downwardly with spring 41 maintaining member 37 in the position shown in FIG. 6 to open microswitch 17.

Figure 4:
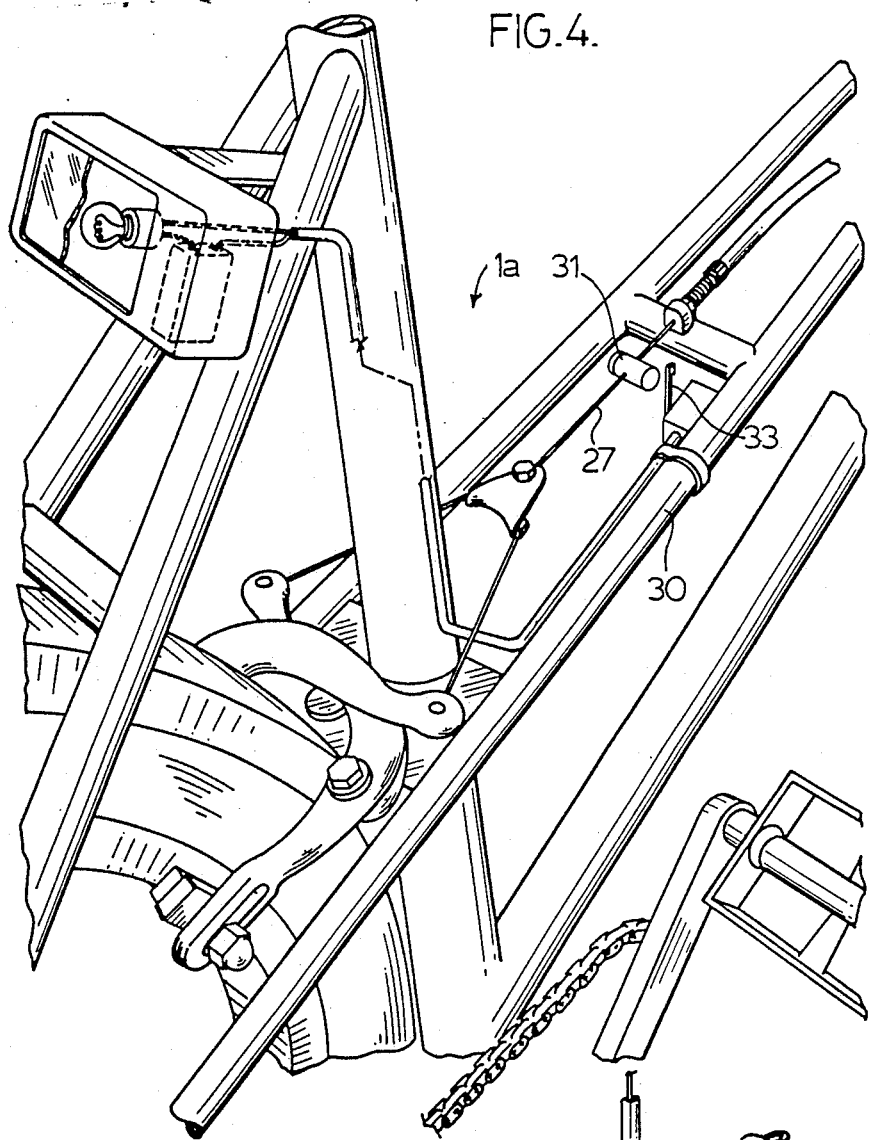
FIG. 4 is a perspective view of a brake light circuit according to further preferred embodiment of the present invention.
Figure 5:
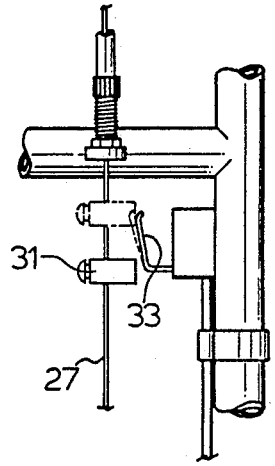
FIG. 5 is a side view showing operation of the circuit closing arrangement from the brake light circuit of FIG. 4.

FIGS. 4 and 5 show a modified brake light circuit arrangement generally indicated at 1a. Like the earlier described circuit 1, this particular circuit includes a housing for an electrical bulb and a battery pack which is wired to that bulb and which is also wired up to a circuit opening and closing arrangement. However, in this case the circuit opening and closing arrangement comprises a first cable mounted member 31 fixedly secured to cable 27 and a microswitch 33 supported from bicycle frame portion 30. Again, because of the spring bias of the caliper brake itself these two contacts are normally open as shown in FIG. 4 and in FIG. 5 in solid lines. However, when the hand brake is applied cable 27 is pulled upwardly as described with respect to the earlier embodiment causing member 31 to close the microswitch as shown in dotted lines in FIG. 5. When the hand brake is released the spring loaded caliper assembly will cause the cable mounted member 31 secured to the cable to return to the FIG. 4 position away from the microswitch to open the circuit.

It will now been seen from the description above, how a bicycle light circuit, in accordance with the present invention can quickly and easily be installed to a standard cable controlled caliper bicycle brake. Furthermore, because the circuit is open and closed directly from the cable, the circuit is not subject to wear problems as is the case when relying upon the pad of the brake for ensuring proper closure of the circuit.

Although various preferred embodiments of the invention have been described, it will be appreciated that variations may be made without departing from the spirit of the invention or the scope of the appended claims.

The embodiments of the invention in which an exclusive property or privilege is claimed are defined as follows:

1. A bicycle having a cable controlled brake and a brake light circuit operated by said cable controlled brake, said circuit comprising a brake light, an electrical power supply for operating said brake light, and a circuit opening and closing arrangement at least part of which is mountable to and movable with said cable and including switching means for opening and closing said circuit, said switch means being covered by and operated internally of a protective housing to activate said power supply when applying said brake, said switch means further comprising a switch member supported within a first cable mounting member with said switch member being laterally offset from said cable and a second cable mounting member for lateral transfer of movement from said cable to said switch member.

2. A bicycle with cable controlled brake and brake light circuit as claimed in claim 1, wherein each of said first and second cable mounting members includes mounting slots exposed laterally therealong and into which said cable is fittable without removing said cable from said bike.

3. A bicycle with cable controlled brake and brake light circuit as claimed in claim 2, wherein each of said first and second cable mounting members includes a side mounting bracket for securing to said cable.

4. A bicycle with cable controlled brake and brake light circuit as claimed in claim 3, wherein the mounting bracket of said first cable mounting member is slideable along said cable and the mounting bracket of said second cable mounting member is locked on said cable to provide relative movement between said first and second cable mounting members.

5. A bicycle with cable controlled brake and brake light circuit as claimed in claim 4, including spring means between said cable mounting members and biasing said second cable mounting member away from said switch member supported in said first cable mounting member.

6. A bicycle with cable controlled brake and brake light circuit as claimed in claim 1, wherein said switch means comprises a microswitch.

* * * * *